Jan. 7, 1941. H. J. WADDELL 2,228,190
ADJUSTABLE SELF-SEALING VALVE
Filed March 7, 1940 2 Sheets-Sheet 2
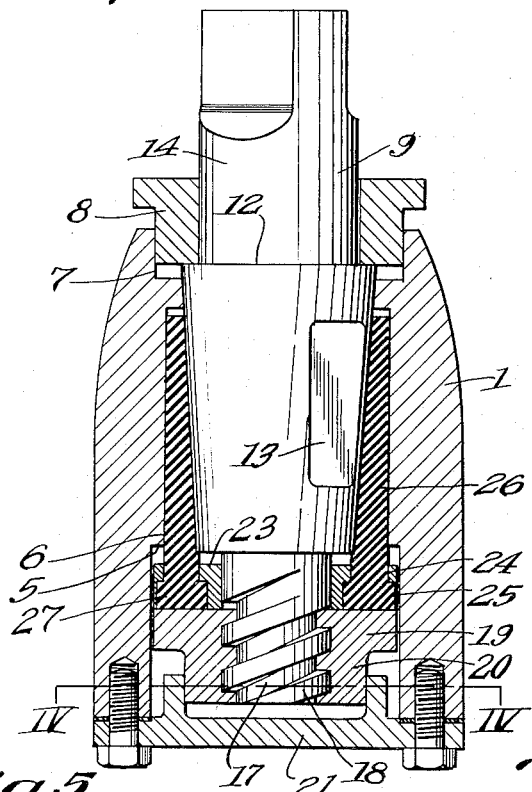
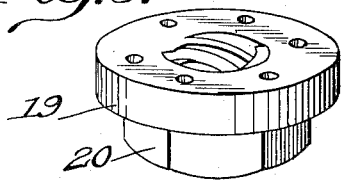
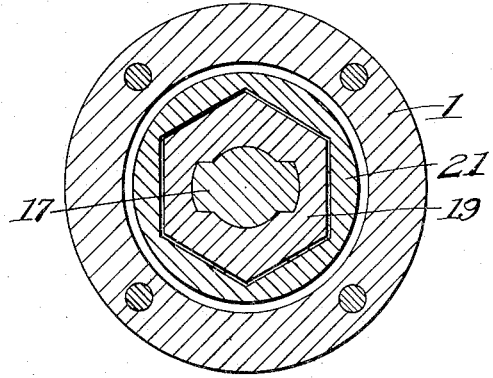
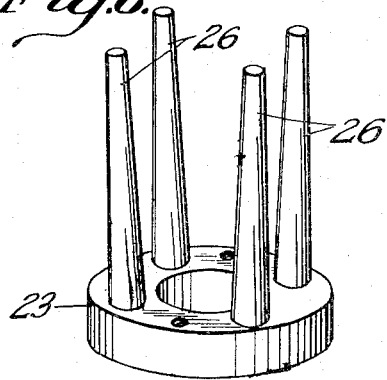
Inventor
Homer J. Waddell
By W. S. McDowell
Attorney Patented Jan. 7, 1941

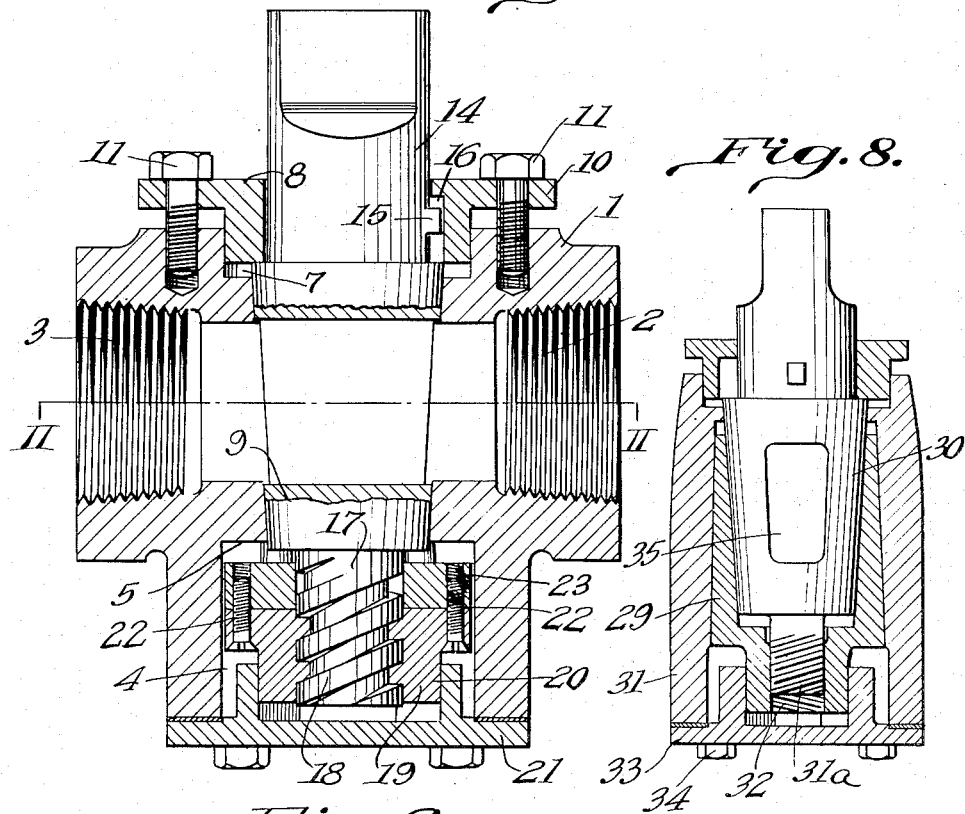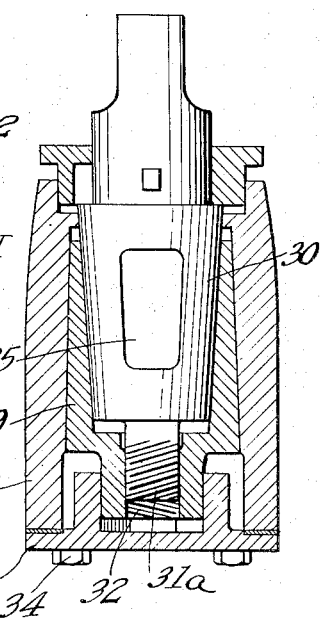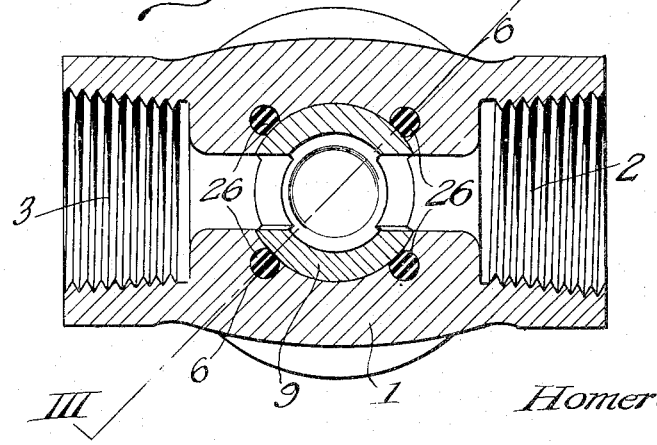

2,228,190

UNITED STATES PATENT OFFICE 2,228,190

ADJUSTABLE SELF-SEALING VALVE

Homer J. Waddell, Baltimore, Ohio

Application March 7, 1940, Serial No. 322,781

13 Claims. (Cl. 251—113)

This invention relates to stop valves and is particularly directed to a valve having self-sealing features. The primary object of the invention resides in providing a valve of the tapered plug type with means for sealing the joint between the plug and the body when the plug is turned to a valve closing position.

It is also an object to provide a valve in which a plug member is rotatably positioned and having means for lessening the resistance to turning movement of the valve upon initial movement from valve closing to valve opening positions, said means providing a seal between the plug and the body and eliminating the necessity of lubricating the valve plug.

It is a further object to provide a valve having a body formed with a socket for the reception of a plug, the wall of the socket being provided with recesses for receiving pliable sealing members. Means are also provided to effect the movement of the sealing members toward the plug upon rotary movement of the plug.

A still further object resides in providing a stop valve with a sealing member which completely surrounds the valve plug and is connected thereto in such manner that movement of the plug between valve opening and closing positions provides for longitudinal movement of the sealing member in order that it may be firmly engaged with the plug and the valve body.

Another object resides in providing a valve having a body formed with a tapered socket, the walls of which are provided with longitudinally extending recesses adjacent the sides of the inlet port, the recesses receiving rubber sealing strips and providing means for forcing the sealing strips into firm engagement with the valve plug when the same is moved to a valve closing position, the flexibility of the sealing strips serving to prevent the passage of fluid between the plug and the valve body.

A still further object resides in providing a valve having a body formed with a tapered socket and positioning a tapered plug in the socket, the plug having a threaded extension which cooperates with a similarly threaded nut member which is secured against rotation and upon rotary movement of the plug will move longitudinally thereof to effect movement of one or more sealing members into firm engagement with the outer surface of the plug and the inner surface of the valve body.

With these and other objects in view, the invention resides in the novel construction and relation of parts more specifically set forth in the following description and the accompanying drawings in which several modifications of the invention have been illustrated in detail.

In the drawings:

Fig. 1 is a vertical longitudinal sectional view taken through a valve formed in accordance with the present invention;

Fig. 2 is a horizontal sectional view taken on the plane indicated by the line II—II of Fig. 1;

Fig. 3 is a vertical sectional view taken on the plane indicated by the line III—III of Fig. 2;

Fig. 4 is a detail horizontal sectional view taken on the plane indicated by the line IV—IV of Fig. 3;

Fig. 5 is a perspective view of a nut member used in the valve;

Fig. 6 is a perspective view showing a collar which is attached to the nut member and is provided with a plurality of flexible tapered sealing members;

Fig. 7 is a perspective view of a modified form of sealing member;

Fig. 8 is a vertical transverse sectional view taken through a modified form of valve.

Referring more particularly to the drawings, the numeral 1 designates a body of the preferred form of valve. This body is preferably formed from a relatively hard material such as cast iron and is provided with inlet and outlet ports 2 and 3 which are threaded at their outer ends to receive the threaded ends of pipe sections forming a part of the pipe line in which the valve is positioned. The body 1 is also provided with a tapered socket extending at right angles to the longitudinal axes of the inlet and outlet ports and being in open communication with these ports. The lower end of the body is circular in horizontal cross section and is provided with an opening 4 having a greater diameter than that of the lower end of the socket. By having the opening 4 of this increased size, an annular shoulder 5 is provided at the junction between the opening 4 and the socket, this shoulder being provided for the reception of a plurality of openings 6 which extend upwardly into the valve body and have their longitudinal axes arranged in close proximity to the socket in order that the openings will communicate with the socket throughout their entire length. In this instance, the openings are circular in horizontal cross section and are slightly tapered, the greatest diameter being at the lower end, the taper being reverse to that of the socket.

The upper end of the body is counterbored as at 7 for the reception of a collar member 8 employed in holding a tapered plug 9 in the socket, the collar being provided with a plurality of ears 10 through which screws 11 extend and have their threaded shanks received in openings formed in the valve body 1. The lower end of the collar engages an annular shoulder 12 formed on the plug 9 and serves, when the screws 11 are threaded into the body, to force the plug 9 downwardly into the tapered socket in the body 1. When the screws are thus positioned in the body and the outer surface of the plug is in engagement with the walls of the socket, the plug is restrained against longitudinal movement. Intermediately of its ends, the plug member is provided with a transverse port 13 which establishes communication between the inlet and outlet openings when the plug is in the position shown in Fig. 1. If it is desired to interrupt this communication, the plug may be rotated approximately 90 degrees in order that the port 13 will be moved out of registration with the inlet and outlet ports. To limit the degree of rotary movement of the plug, the reduced shank portion 14 thereof is provided with an exteriorly disposed projection 15 positioned in a recess 16 extending one-fourth of the distance around the collar 8. When the plug is rotated, the projection 15 will engage the shoulders formed at the ends of the recess and further movement of the plug will be prevented.

At its lower end, the plug is provided with an extension 17 having a plurality of screw threads 18 thereon, the pitch of these threads being rather sharp to provide for relatively rapid movement of a nut 19 adjustably positioned on the projection. This nut is reduced at its lower end as at 20 and is hexagonal in horizontal cross section, the lower end of the nut being received within a similarly formed opening in a cap member 21 secured to the lower end of the body. By reason of the engagement of the surfaces of the hexagonal portion of the nut with the sides of the opening in the cap, the nut is restrained against rotation and when the plug is revolved, the nut will be caused to move longitudinally on the extension 17.

Secured to the upper surface of the nut member by screws 22 is a circular collar 23 formed with a plurality of openings 24, the lower ends of which are counterbored as at 25. These openings are formed for the reception of rubber sealing strips 26 which, in the preferred form, are of tapered configuration and resemble tapered pins. The larger ends of the strips have heads 27 integrally formed therewith and positioned in the counterbored portions of the openings 24. When the collar is secured to the nut with the sealing strips positioned therein as disclosed in Fig. 3, the strips are securely retained within the collar and will move in unison with the nut.

It will be seen that when the plug is moved from the position shown in Fig. 1 to a valve closing position, the nut will be drawn upwardly into the valve body and the sealing strips 26 will be moved into the recesses 6 to a greater extent and, due to the tapered formation of the recesses and the sealing strips or pins, the latter will be compressed by the sides of the recesses. Since the sides of the recesses are interrupted when they communicate with the socket, the excess material of the sealing strips will be forced out of the recesses and into the socket. However, inasmuch as the socket is entirely filled by the plug, the sealing member will be moved into firm engagement with the sides of the plug.

In the event any irregularities are present in the side walls, the flexibility of the sealing member will permit the irregularities to be filled, thus preventing fluid flow between the plug and the sealing member.

It frequently happens in the operation of a plug valve that leaks develop due to the plug being scored between the edges of the port formed therein. When this scoring occurs, the fluid in the pipe line is permitted to pass through the groove formed by the scoring and continued flow wears the material of the plug permitting the leakage to increase in quantity. Previously, this defect could only be remedied by removing the plug and regrinding or replacing it. If the plug in the present valve should be scored, the flexibility of the sealing strips will permit a portion thereof to be pressed into the groove formed by the scoring and fluid flow therethrough will be prevented. Since no fluid will flow through the groove, it will not increase in size as the grooves have done in the previous valves.

While the sealing strips have been illustrated as being circular in cross section, in the preferred form, it is obvious that they could be formed with other shapes such as shown in Fig. 7. In this instance, the sealing strip 28 has a rectangular cross section and tapers from one end toward the other to form a wedge-like body. When sealing strips of this type are employed, the recess in the body will be rectangular in cross section and will have one open side to establish communication between the recesses and the socket. It is preferable to employ the round sealing strips since it is much easier to form the recesses of this shape. If the rectangular recesses are employed, they must be formed either by a broaching or milling operation. When the round recesses are formed, a drilling operation is employed which may be performed without requiring the valve body to be clamped in a machine.

In the modified form of the invention shown in Fig. 8, the sealing strips have been replaced by a sleeve-like member 29 which extends around the plug 30. When this sleeve is employed, the valve body 31 is provided with a tapered socket, the larger end of which is disposed at the lower end of the body. The sleeve has a tapered socket formed therein, the larger end of this socket being disposed at the upper end of the sleeve to receive the plug 30. The lower end of the plug is provided with a reduced threaded extension 31a which is received within a threaded opening 32 formed in the reduced lower end of the sleeve. The sleeve is prevented from rotating by forming the lower end with a hexagonal cross section and positioning it in a similarly shaped opening in the cap 33 which is secured to the lower end of the valve body by screws 34. It will be obvious that the sides of the sleeve will be provided with openings which register with the inlet and outlet ports in the body and since the sleeve is restrained against rotation, these openings form continuations of the inlet and outlet ports. When the plug is revolved to move the port 35 out of registration with the openings in the sleeve, the latter will move upwardly into the body and the outer walls will be firmly engaged with the inner walls of the valve body. Movement of the sleeve will also cause a firm engagement of the tapered plug with the inner walls of the socket in the sleeve and fluid flow through the joints between the sleeve and the plug and body will be precluded. Preferably the sleeve 29 will be formed of a softer material than the valve body to obtain a better seal.

While the sealing members 26 and 28 have been described as being formed of rubber, it is obvious that they might be formed of other materials such as leather, metal or plastics. The only requirement is that the material possesses pliability. While the invention has been illustrated in several forms, it is obvious that many minor changes may be made in the construction and relation of parts without departing from the spirit and scope of the invention as set forth in the following claims.

What is claimed is:

1. A stop valve comprising a body having a tapered socket and inlet and outlet ports communicating therewith, said body having a plurality of tapered sockets of reduced size formed therein at points spaced circumferentially with respect to said first socket, the larger ends of said reduced sockets being adjacent the smaller end of said first socket, said reduced sockets being in communication with said first socket throughout the full length of the former, a tapered plug positioned for rotation in said first socket, said plug having a port formed for registration with said inlet and outlet ports, means for maintaining the longitudinal position of said plug with relation to said socket, a reduced threaded extension provided on the inner end of said plug, a nut member adjustably disposed on said extension, means for preventing rotation of said nut member, rotation of said plug serving to move said nut member longitudinally of said plug, and a plurality of flexible tapered pins carried by said nut member, said pins being positioned for longitudinal movement in the circumferentially spaced sockets, movement of said nut longitudinally of said plug serving to move said pins into and out of said sockets, movement into said sockets serving to press the sides of said pins into firm engagement with said plug.

2. A plug valve comprising a body having a tapered socket and inlet and outlet ports communicating therewith, said body having a tapered recess adjacent each side of one of said ports, said recesses extending longitudinally of said socket, the taper of said recesses being reverse to that of said socket, a tapered plug secured for rotation in said socket, said plug being provided with a passage to establish communication between said inlet and outlet ports, a threaded extension at the smaller end of said plug, nut means adjustably carried by said extension, means for preventing rotation of said nut means, rotation of said plug serving to impart longitudinal movement to said nut, flexible tapered pin members carried by said nut means and positioned for longitudinal movement in said recesses, movement of said plug to a position to interrupt communication between the inlet and outlet ports serving to move said pins into said recesses, the taper of said recesses and pins causing movement of the latter into firm engagement with said plug.

3. A plug valve comprising a body having a tapered socket and inlet and outlet ports communicating therewith, said body having a tapered recess adjacent each side of one of said ports, said recesses extending longitudinally of said socket, the taper of said recesses being reverse to that of said socket, a tapered plug secured for rotation in said socket, said plug being provided with a passage to establish communication between said inlet and outlet ports, a threaded extension at the smaller end of said plug, nut means adjustably carried by said extension, rotation of said plug serving to impart longitudinal movement to said nut, flexible tapered pin members carried by said nut means and positioned for longitudinal movement in said recesses, movement of said plug to a position to interrupt communication between the inlet and outlet ports serving to move said pins into said recesses, the taper of said recesses and pins causing movement of the latter into firm engagement with said plug.

4. In a plug valve, a body having inlet and outlet ports and a tapered socket communicating therewith, said socket being open at both ends, said body having a recess extending longitudinally of said socket wall adjacent each side of one of said ports from the smaller end of said socket, one wall of each recess being inclined with respect to the wall of said socket, a plug disposed in said socket, said plug having a port disposed for registration with said inlet and outlet ports upon rotation of said plug, a threaded extension provided at the smaller end of said plug, a threaded collar adjustably positioned on said plug extension, pliable pin members secured to said collar and disposed for longitudinal movement in said recesses, movement of said plug to a position to interrupt communication between said inlet and outlet ports serving to move said pins into said recesses to cause firm engagement of said pins with said plug.

5. In a plug valve, a body provided with inlet and outlet ports and a tapered socket communicating therewith, the wall of said socket being provided with at least two recesses extending longitudinally thereof, a plug disposed for rotary movement in said socket, a pliable pin-like body positioned in each recess, and means operated by the rotation of said plug for moving said pin-like bodies longitudinally of said recesses, the walls of said recesses being so shaped as to cause said bodies to move toward said plug during movement into said recesses.

6. In a plug valve, a body having inlet and outlet ports and a socket communicating therewith, the wall of said socket being provided with recesses extending longitudinally thereof between the inlet and outlet ports, a plug disposed in said socket, said plug being movable between flow-establishing and flow-obstructing positions, a pliable body positioned in each recess, and means operable upon rotary movement of said plug from the flow-establishing to the flow-obstructing position to move said pliable bodies into firm engagement with said plug.

7. In a plug valve, a body having inlet and outlet ports and a socket communicating therewith, a plug having a transverse port disposed in said socket, said plug being movable from flow establishing to flow obstructing positions, a sealing member disposed between the outer surface of said plug and inner surface of said body, said member being movable relative to said plug and body, and means operated by the rotation of said plug for moving said sealing member.

8. In a plug valve, a body having inlet and outlet ports and a socket communicating therewith, a plug rotatably disposed in said socket, said plug having a port formed for registration with said inlet and outlet ports upon rotation of said plug, a sealing member disposed for movement between the outer surface of said plug and said body, said member being movable toward and away from said plug, and means for transmitting movement from said plug to said sealing member, movement of the former to interrupt the registration of the port therein with the inlet and outlet ports serving to cause the sealing member to move toward said plug.

9. In a plug valve, a body having inlet and outlet ports and a socket communicating therewith, a sealing sleeve having a tapered socket disposed for longitudinal movement in said body socket, said sleeve having openings for registration with said inlet and outlet ports, a ported tapered plug rotatably positioned in the socket in said sleeve, means for resisting the rotation of said sleeve, and means for transmitting movement from said plug to said sleeve, said means serving to move said sleeve toward the larger end of said plug when the latter is turned to move the port therein out of registration with the openings in said sleeve.

10. In a plug valve, a body having inlet and outlet ports and a tapered socket communicating therewith, a sealing sleeve positioned in said socket, said sleeve having openings in registration with said inlet and outlet ports and a tapered socket extending longitudinally thereof, the taper in said sleeve socket being reverse from that of said body, a plug disposed for rotation in said sleeve socket, means for preventing rotary movement of said sleeve, means for resisting longitudinal movement of said plug, and motion transmitting means between said plug and sleeve for imparting longitudinal movement to the latter upon rotation of the former.

11. In a plug valve, a body having inlet and outlet ports and a tapered socket communicating therewith, a uniformly tapered plug positioned in said socket for rotary adjustment therein, said plug having a transverse port to establish communication between the inlet and outlet ports when said plug is in one position of adjustment, a sealing member disposed between said plug and the inner wall of said body, said sealing member being tapered in a direction reverse to that of said plug, said sealing member being movable relative to said plug and body, and means connecting said plug and member and operated by the adjustment of said plug from an open to a closed position to move said member toward the larger end of said plug.

12. In a plug valve, a body having inlet and outlet ports and a tapered socket communicating therewith, a uniformly tapered plug disposed in said socket for rotary adjustment relative to said body, said plug having a transverse port to establish communication between the inlet and outlet ports when said plug is in one position of adjustment, means for limiting the degree of axial movement of said plug relative to said body, a sealing member disposed between said plug and body, said member being tapered in a direction reverse to that of said plug, said member being movable longitudinally relative to said plug, means for preventing rotary movement of said member, and means operated by the rotation of said plug for moving said member toward the larger end of said plug.

13. In a valve of the type having a body formed with inlet and outlet ports and a tapered socket therebetween, a tapered plug disposed in said socket for rotary movement, said plug being provided with a port to establish communication between the inlet and outlet ports, means for limiting the longitudinal movement of said plug, screw thread means provided at the smaller end of said plug, a sealing member positioned between said plug and the wall of said socket, said member being movable longitudinally of said socket, means for preventing rotary movement of said sealing member relative to said body, and screw threads on said member to receive those on said plug, rotation of said plug from an open to a closed position serving to move said sealing member toward the large end of said plug.

HOMER J. WADDELL.